US008037167B1

(12) United States Patent
Bellovin (10) Patent No.: US 8,037,167 B1
(45) Date of Patent: Oct. 11, 2011

(54) METHOD FOR DETECTING HOSTS BEHIND NETWORK ADDRESS TRANSLATORS

(75) Inventor: Steven Michael Bellovin, Westfield, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 1359 days.

(21) Appl. No.: 10/329,145

(22) Filed: Dec. 24, 2002

(51) Int. Cl.
*G06F 15/173* (2006.01)
*H04L 5/22* (2006.01)
*H04J 3/24* (2006.01)

(52) U.S. Cl. ......... 709/224; 709/223; 370/300; 370/474
(58) Field of Classification Search .......... 709/223–227; 370/300, 474
See application file for complete search history.

(56) References Cited

U.S. PATENT DOCUMENTS

| | | | | |
|---|---|---|---|---|
| 5,265,237 | A * | 11/1993 | Tobias et al. | 710/65 |
| 5,327,537 | A * | 7/1994 | Corcoran et al. | 712/200 |
| 6,253,337 | B1 | 6/2001 | Maloney et al. | 714/38 |
| 6,606,316 | B1 * | 8/2003 | Albert et al. | 370/389 |
| 6,711,164 | B1 * | 3/2004 | Le et al. | 370/392 |
| 6,892,245 | B1 * | 5/2005 | Crump et al. | 709/245 |
| 6,928,082 | B2 * | 8/2005 | Liu et al. | 370/401 |
| 7,116,683 | B1 * | 10/2006 | Petersen et al. | 370/474 |
| 2003/0061339 | A1 * | 3/2003 | Benfield et al. | 709/224 |

OTHER PUBLICATIONS

Schneier, B., Mudge, "Cryptanalysis of Microsoft's point-to-pont tunneling protocol (PPTP)", Conference of Computer Communication Security; pp. 132-141. 1998. [retreived from ACM database-Sep. 26, 2006].*

Bellovin, S., "A technique for counting natted hosts", Internet Measurement Conference; SESSION: Session 9: traffic analysis; pp. 267-272. 2002. [retreived from ACM database-Sep. 26, 2006].*

Spring, N.,Mahajan, R.,Wetherall, D."Measuring ISP topologies with rocketfuel",Applications, Technologies, Architectures,and Protocols for Computer Communication; SESSION: Measugin and simulating networks; pp. 133-145. 2002. [retreived from ACM database-Sep. 26, 2006].*

Spring, N., Mahajan R., Wetherall D., Anderson T.,"Measuing ISP Topologies with Rocketfuel", IEEE/ACM Transactions on Networking (TON); vol. 12, Issue 1 pp. 2-16. Feb. 2004. [retrieved from ACM database Mar. 23, 2007].*

Padmanabhan, V., Subramanian, L., "An Investigation of Geographic MApping Techniques for Internet Hosts", Proceedings of the 2001 conference on Applications, technologies, architectures, and protocols for computer communications; pp. 173-185. 2001. [retreived from ACM database Mar. 23, 2007].*

Alex C. Snoeren, "Hash-based IP traceback".Proceedings of the 2001 conference on Applications, technologies, architectures, and protocols for computer communications; pp. 3-14. 2001. [retreived from ACM Mar. 28, 2008].*

V. Paxson, "An analysis of using reflectors for distributed denial-of-service attacks". ACM SIGCOMM Computer Communication Review, vol. 31 , Issue 3 (Jul. 2001);SESSION: Papers table of contents pp. 38-47. 2001. [retreived from ACM Mar. 28, 2008].*

(Continued)

*Primary Examiner* — Philip Chea
*Assistant Examiner* — Lashanya Nash
(74) *Attorney, Agent, or Firm* — Akerman Senterfitt; Michael K. Dixon (57) ABSTRACT

The present invention is a method and apparatus for counting the number of active hosts behind network address translation boxes. The technique is based on the observation that on many operating systems, the IP header's ID field is a simple counter. By suitable processing of trace data, packets emanating from individual machines can be isolated, and the number of machines determined.

40 Claims, 7 Drawing Sheets

OTHER PUBLICATIONS

John Bellardo, Stefan Savage, "Measuring packet reordering", Proceedings of the 2nd ACM SIGCOMM Workshop on Internet measurment, Nov. 6-8, 2002, Marseille, France [retrieved from ACM on Dec. 18, 2009].*

J. Ioannidis and S. Bellovin. Implementing Pushback: Router-Based Defense Against DDoS Attacks. In Proceedings of NDSS '02, Feb. 2002. [retrieved from Internet "http://citeseerx.ist.psu.edu/viewdoc/summary?doi=10.1.1.16.2012" on Jun. 19, 2010].*

Postel (Editor), "Internet Protocol", Sep. 1, 1981, 51 page(s), IETF.

Srisuresh & Egevang, "Traditional IP Network Address Translator (Traditional NAT)", Jan. 1, 2001, 17 page(s), The Internet Society.

* cited by examiner

| Parameter | Value |
|---|---|
| *timelim* | 300 |
| *gaplim* | 64 |
| *timefac* | 5 |
| *gapfac* | 70 |
| *fsize* | 50 |

METHOD FOR DETECTING HOSTS BEHIND NETWORK ADDRESS TRANSLATORS

FIELD OF THE INVENTION

The present invention relates generally to gathering information in a network, and more particularly, to a method of counting hosts residing behind a network address translator in a packetized network.

BACKGROUND OF THE INVENTION

Advanced Internet protocol (IP) packet routing capabilities have become available as an integral part of operating systems. Those capabilities allow flexible packet routing and network address and port translation. Network address translation (NAT) is the dynamic replacement of the source or destination network IP address of a packet as part of the routing process. For a description of network address translation, see P. Srisuresh and K. Egevang, "Traditional IP Network Address Translator (Traditional NAT)," RFC 3022, Internet Engineering Task Force (hereinafter "IETF"), January 2001, the contents of which are hereby incorporated by reference herein.

Figure 1:
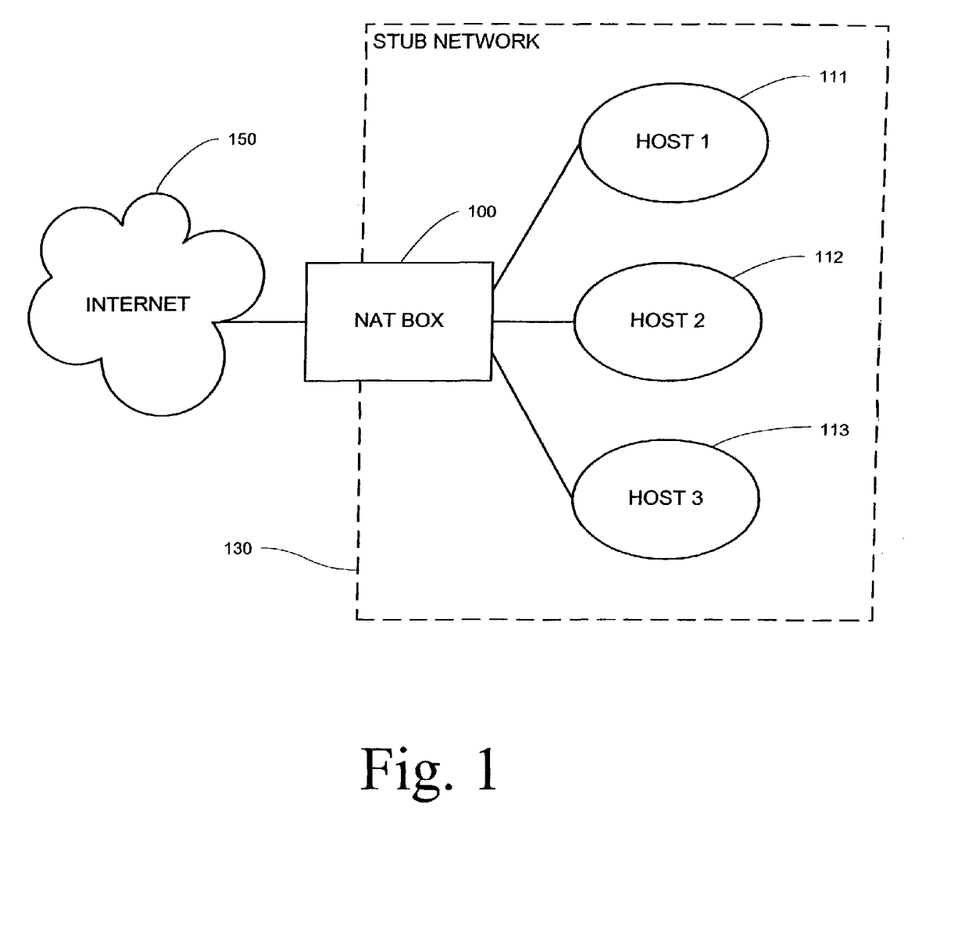
FIG. 1 is a schematic view of a network utilizing a network address translator.

As illustrated in FIG. 1, a "network address translator" or "NAT box" or "NAT" 100 has been used as a tool for allowing plural hosts 110, 111, 112 in a stub network 130 to access the Internet (or another packet network) 150 using a single or only a few IP addresses. As commercially available for use in a home networking environment, such a box includes a processor for performing routing functions, ports such as 100 BaseT ports or 802.11 wireless connections for connecting hosts and other devices behind the box in a local area network, and a port for connecting to the outside network. In many available arrangements, the processor is configurable by one of the networked hosts. Such an arrangement hides the actual configuration of the network behind the NAT box from probes received on the open Internet, while conserving the number of global Internet addresses actually used.

NATs pose many challenges to protocols and to the Internet architecture. Relevant to the present invention, NATs pose a barrier to counting the number of hosts on the Internet. Until now, there has been no way to count how many distinct hosts are hidden behind NATs. Such counting is useful in certain situations to be able to detect the existence of NAT boxes, and to tell how many computers are behind one.

A NAT box will use a very small number of IP addresses—perhaps just one—but can act as a relay for many different hosts behind it. Some cable companies restrict such usage as part of their "terms of service." There are reports in the press of people reselling broadband services, especially via 802.11 wireless networks, to neighbors, in violation of tariffs and usage policies. Generally, such resale is via NAT boxes. Network access providers therefore have a need to count the number of hosts that are utilizing a single account.

The present invention takes advantage of an identifier such as the "ID" field located in headers of packets leaving the NAT box. IP protocol defines an IP header containing protocol information. The header is located at the beginning of an IP packet. For a more complete definition of the IP header and its fields, see J. Postel, "Internet Protocol," RFC 791, IETF, September 1981, the contents of which are hereby incorporated by reference herein. The IP header contains fields ranging in length from 3 to 32 bits that are assigned to carry information such as the protocol and protocol version of the header, the total length of the packet, a fragment offset for the case where the packet has been fragmented, a time to live, a header checksum, the source and destination addresses, etc.

The "ID" field in an IP header (or "IPid") is an identifying value assigned by the sender to aid in assembling the fragments of a packet. The field is used by a receiving host to distinguish the fragments of one datagram from those of another. The originating protocol module is required under the IP protocol to set the IPid to a value that is unique for that source/destination pair and protocol for the time the datagram will be active in the system.

To assemble the fragments of an Internet datagram, an Internet protocol module at a destination host combines Internet datagrams that all have the same value for the four fields: IPid, source, destination, and protocol. If there is no fragmentation, there is no need for the IPid field. On the other hand, fragmentation can, in theory, happen anywhere. The IPid field must therefore be unique in all "live" packets that have the same protocol number and source and destination IP addresses.

SUMMARY OF THE INVENTION

The present invention addresses the needs described above by providing a method for counting hosts behind a network address translator in a network that uses a protocol defining packets with identifiers. The method includes the steps of reading a plurality of identifiers of packets transmitted from the network address translator, forming subsets of the packets based on the identifiers, and counting the subsets of packets.

The identifiers may comprise values in ID fields of packet headers. In that case, the subsets may comprise packets containing substantially sequential series of ID field values. Each of the sequential series of ID field values may contain no gaps greater than a predetermined maximum.

The method may also include the step of forming byte-swapped subsets of the plurality of identifiers. Each byte-swapped subset is a sequential series of byte-swapped values of the identifiers. The counting step in that case includes counting the byte-swapped subsets of identifiers.

The method may further include the step of dropping identifiers having a value of zero.

The identifiers may include, for each packet, contents of an ID field and at least one identifier indicative of a connection. The identifier indicative of the connection may include image file references in content of the packets. If the connection is a TCP connection, the identifier indicative of the connection may be contents of packet header fields for source host, source port, destination host, and destination port. If the connection is a RTP connection, the identifier indicative of the connection may be contents of packet header fields for source machine identifier, sequence number, and timestamp.

In each of those cases, the step of forming subsets may include the steps of forming groups of packets according to the identifier indicative of a connection, and forming the subsets by linking groups according to the contents of the ID field. The groups may be linked by determining a pattern of ID field contents in packets within a group, and then linking the groups according to the pattern of ID field contents. That pattern may be a byte swapped sequence. The pattern of ID field contents may be determined using cryptanalysis.

Another embodiment of the invention is a method for determining a number of hosts behind a network address translator in a network that uses a packet protocol defining a header with an ID string. The method includes the steps of reading an ID string from a packet header of a packet transmitted from the network address translator, and comparing the ID string with at least one series of ID strings formed from a plurality of previously read ID strings. If the ID string matches one of the series of ID strings, the ID string is added to the one series. Otherwise, a new series is started with the ID string. The series of ID strings are then counted to determine the number of hosts behind the network address translator.

In that method, the series of ID strings may contain ID strings with values that are substantially consecutive. The comparing step may include the steps of checking whether the ID string is more than a predetermined time limit older or newer than a last read ID string in a series, and, if so, deeming the string not to match that series.

The method may further include the step of dropping ID strings having a value of zero. Alternatively, a series may be formed of ID strings having a value of zero.

The method may include the step of coalescing at least one pair of ID string series having endpoints that are within a predetermined value of each other. The coalescing step may be performed only on pairs of ID string series that further have endpoints that are within a predetermined time limit of each other.

The method may include the step of discarding series of ID strings having a number of ID strings lower than a predetermined minimum. The ID string may be compared with at least one series of byte-swapped ID strings formed from byte-swapped values of the previously read ID strings. The ID string may be added to more than one series if the ID string matches each of those series equally well.

The comparing step may include checking whether the ID string has a value that is more than a predetermined value higher or lower than a value of a last read ID string in a series, and, if so, deeming the string not to match that series.

The comparing step may include checking whether the ID string has a value exactly one higher than a value of a last read ID string in a series, and, if so, deeming the string to match that series; and, if not, checking whether the ID string has a value that is within a predetermined value higher or lower than a value of a last read ID string in a series, and, if so, deeming the string to match that series.

In another embodiment of the invention, a method is provided for determining a number of hosts behind a network address translator in a network that uses a packet protocol defining a connection identifier and a header with an ID string. That method starts by reading a connection identifier from a packet transmitted from the network address translator. Based on the connection identifier, the packet is placed in a group containing other packets transmitted over a common connection. Based on ID strings of packets, the group is coalesced with one or more other groups originating from a common host, to form series of packets. The series of packets are then counted to determine the number of hosts behind the network address translator.

The series may comprise packets containing substantially sequential series of ID field values. The connection identifier may include image file references in content of the packets. If the connection is a TCP connection, the connection identifier may be contents of packet header fields for source host, source port, destination host, and destination port. If the connection is a RTP connection, the connection identifier may be contents of packet header fields for source machine identifier, sequence number, and timestamp.

The method may also include the step of determining a pattern of ID field contents in packets within a group. In that case, the groups are coalesced according to the pattern of ID field contents. The pattern of ID field contents may be determined by determining whether the pattern is a byte swapped sequence. The pattern may be determined using cryptanalysis.

These and other advantages of the invention will be apparent to those of ordinary skill in the art by reference to the following detailed description and the accompanying drawings.

DESCRIPTION OF THE INVENTION

The present invention is based on the observation that the IPid is generally implemented by most hosts as a simple counter. As a consequence, consecutive packets emitted by a host will carry sequential IPid fields. Series of consecutive IPid's represent series of consecutive packets from a given host; by counting the number of series coming from a given IP address, we can determine how many hosts are really represented by that address.

There are, however, a number of factors adding complexity to the method. The most obvious is that not all packets from a given host are sent to the Internet. Some may stay on a LAN; indeed, some are sent to the "loopback" address, and stay within the host. A series from a given host will therefore be "substantially" sequential, but will have gaps. The method of the invention must therefore handle gaps and irregular spacing in the values of the IPid's in a given series.

A second complication is that not all hosts use simple counters. Some use byte-swapped counters. That is, since there are no defined semantics to the IPid field, and hence no reason to make it a counter, some operating systems running on "little-endian" hardware don't bother putting the counter into "network" (big-endian) byte order. In other words, instead of adding 1 each time, 256 is added to the counter; when the value of this counter exceeds 65536 (i.e., 256×256), 1 is added. It is thus necessary to look for two sequences for a given computer, the normal one and the byte-swapped one.

Some hosts take evasive measures. Since the IPid field is used only for fragment reassembly, some Linux kernels use a constant 0 when emitting Path MTU discovery packets, since they cannot be fragmented. Recent versions of OpenBSD and some versions of FreeBSD use a pseudo-random number generator for the IPid field. Some versions of Solaris use separate sequence number spaces for each.

Figure 2A:
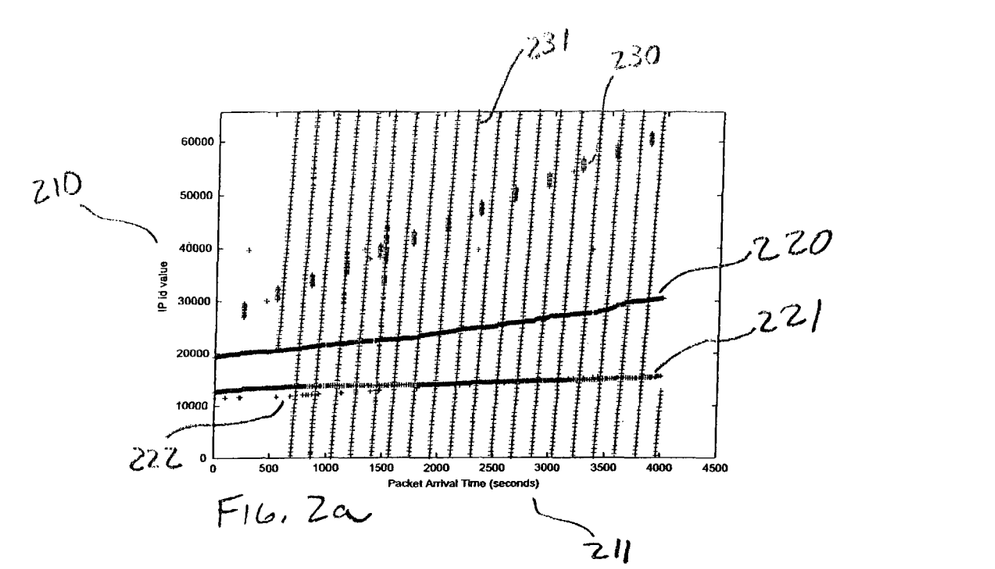
FIGS. 2a and 2b are graphical representations of ID field data from hosts in a network.

FIG. 2a shows a plot of a raw data file containing IPid's. The method of the invention was tested, and the plots herein were constructed, using "synthetic" NAT data, instead of obtaining packet header traces from locations likely to harbor NATs, such as the head end of cable modem systems or the local POP of a DSL provider. Apart from the difficulty of obtaining such traces—the monitoring point needs to be close to the outside of the NAT box, to avoid miscounts because too many packets are going in a different direction—such data provides no easy way to validate the results. That is, while a programmer could build an algorithm and look at the resulting graphs and tables, there would be no way to detect miscounts.

Instead, real trace data was arbitrarily grouped together in various sets of machines as if the machines were behind a NAT. That is, the IPid sequence was analyzed from a set of machines, without looking at the actual IP addresses, precisely as if they were all behind some NAT. Specifically, a wireless LAN having only client machines was used The packet trace data used for testing was from the Internet edge of a facility housing several hundred researchers. That preserved the Intranet/Internet distinction; i.e., the monitor did not see any Intranet-bound packets. The monitor collected only the first 16 bytes of each outbound IP header, omitting the destination IP address and higher-level headers. That preserved privacy: nothing more was learned about any individual host other than the rate at which it sent data to the Internet. Packet destinations were not read. As described below, however, additional information from the IP header, and even information from packet content, is useful in certain embodiments of the invention.

A client-only subnet was used for the analysis. It was believed that the particular algorithms and data structures used in the testing probably could not cope with the IPid change rate of a server. The subnet was divided up into smaller subnets of 16 addresses apiece. The data for each such subnet was then analyzed separately Returning to FIG. 2a, the raw IPid values 210 are plotted chronologically along a time axis 211. It is clear that the raw data shown requires some post-processing before a single scalar value—the number of hosts behind the NAT—is produced. While two hosts 220, 221 appear clearly in the plot, other possibilities, such as grouping 222, also appear. Furthermore, near-vertical lines such as lines 230, 231 may or may not be hosts with byte-swapped IPid fields.

Figure 2B:
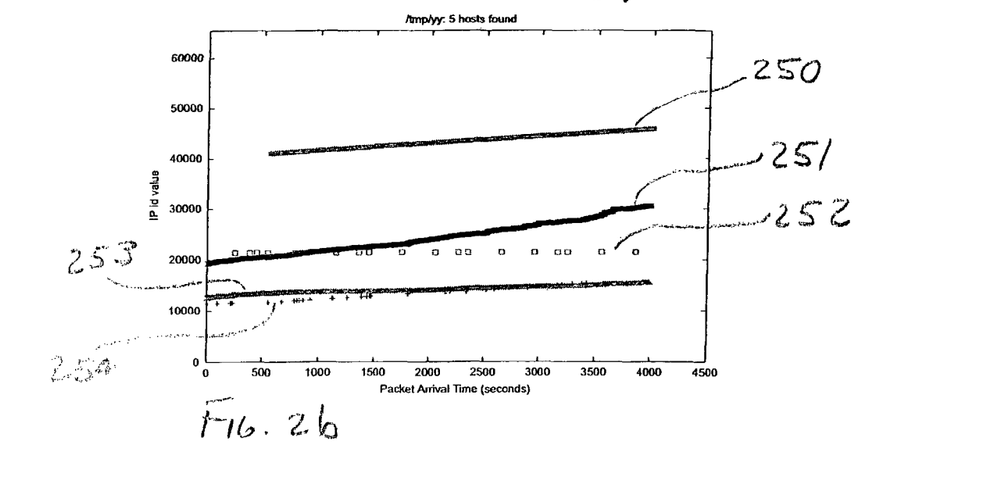

Processing the data using an algorithm according to the present invention permits interpretation of the data in order to produce a host count. For example, FIG. 2b shows the data of FIG. 2a after processing. Five hosts 250-254 are clearly visible.

The basic algorithm used to produce the results shown in FIG. 2b will now be described. In general, the algorithm builds sets of IPid sequences as the IPid's of individual packets are received. When a new packet arrives, the IPid sequences currently in the set are scanned, to determine which sequence is the "best" match for the received IPid string. If a best match is found, then the new IPid is appended to the found sequence; otherwise, a new sequence of length "1" is created. A "best" match is defined according to the following rules:

If the new IPid is more than a predetermined maximum length of time (hereinafter "timelim") older or newer than the last received packet in the sequence, it is deemed not to match, regardless of the other criteria. In a preferred embodiment, the value is timelim is 300 seconds.

If the new IPid is exactly one higher than the last received packet in a sequence, it is deemed a perfect mach to that sequence. Because IPid sequencing is done modulo $2^{16}$, this rule is applied modulo $2^{16}$.

If the new IPid is within a predetermined value range (hereinafter "gaplim") of the last received IPid of the sequence, but has not been seen before, it is labeled "out-of-order." That label is used to determine which candidate sequence a packet should be assigned to. If a packet is a perfect match to one sequence but an out-of-order match to another, it is assigned to the first sequence. In a presently preferred embodiment, there is no distinction between a higher-numbered IPid, which would indicate a small gap, and an IPid lower than the last one received, which indicates out-of-order reception. In a presently preferred embodiment of the invention, gaplim is given a value of 64.

If an IPid has been seen before, it is labeled "Dup." As before, dup is used for sequence match priority.

After a representative number of IPid's have been collected and a number of sequences have been formed, adjacent sequences may be coalesced; i.e., sequences whose ends are close enough are merged. Whether ends of sequences are close enough to be merged is depends on whether the values of potentially adjacent IPid's are within gapfa•gaplim of each other, and whether those IPid's were received within timefa•timelim seconds of each other. Gapfac and timefac are empirically determined factors. In a preferred embodiment, gapfac is 70 and timefac is 5 seconds. Those factors account for hosts that send a moderate amount of local traffic between sequences of Internet activity. While average packet rate was considered as an additional discriminator, experience has shown that that can vary too much.

Finally, sequences that are Composed of less than fsize packets are simply discarded. Fsize has been set to 50 packets in a currently preferred embodiment. While those sequences may represent hosts that do not talk much to the Internet (and indeed, some of those showed up in testing), they can also represent failed guesses at sequences.

Figure 3:
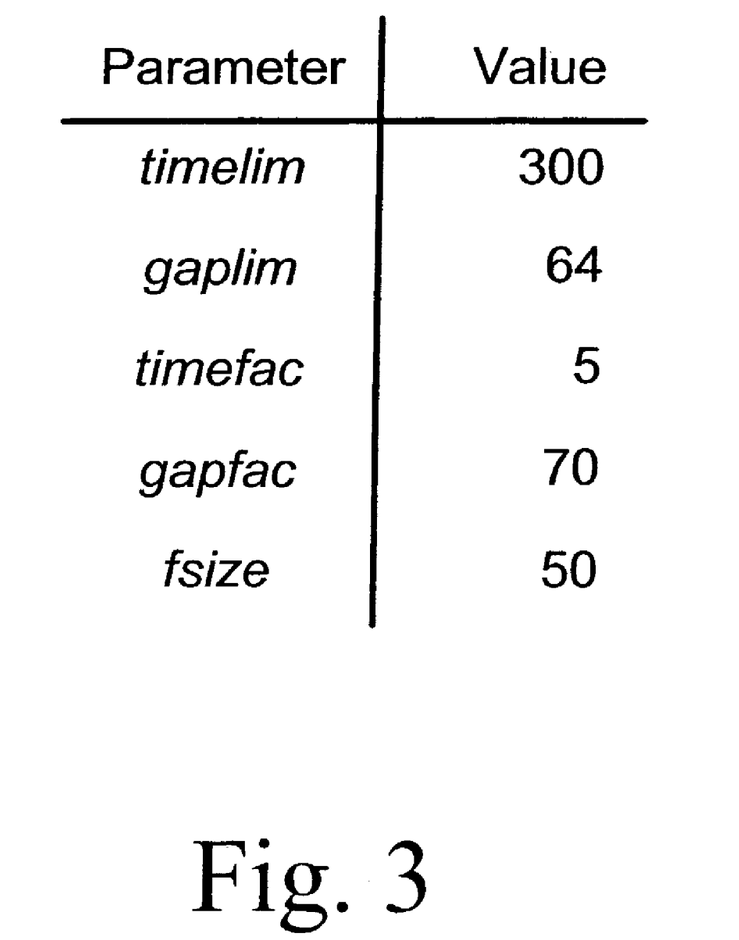
FIG. 3 is a table showing parameter values used in one embodiment of the invention.

Values assigned to the parameters discussed above in a preferred embodiment of the invention are shown in FIG. 3. One skilled in the art will recognize that optimum values for those parameters will change for different environments.

The algorithm must take into account some of the complications described above. For example, a packet with an IPid having a value of 0 is dropped. Those IPid's are never allowed to match any real sequence because they are likely to cause confusion if they are temporally interspaced with a real sequence that is wrapping around modulo $2^{16}$. In an alternative embodiment, those IPid's are assigned to a special non-matching sequence; that would allow determination of their temporal length.

As noted above, the method of the invention must take into consideration sequences of byte-swapped IPid's. Two different collections of sequences are maintained for that reason, one for normally-incremented IPid fields, and one for byte-swapped IPid fields. When a new packet is received, it is matched against both collections. It is added to the sequence it matches best, regardless of which collection the sequence is in. If the new IPid has an equal score on one sequence in each collection, or if it does not match any sequence, it is added to both collections.

The algorithm may consider the case of two or more close matches to two or more sequences in the same collection. In that case the closeness of the new IPid to the expected value (a perfect match) is used as a differentiator.

The algorithm may furthermore deal with the randomized IPid generator used by OpenBSD and FreeBSD operating systems. While cryptanalyzing the generator may not be practical, it is feasible to detect a random background to other, linear sources.

The above-described rules were implemented in an algorithm and analysis results were compared to the actual IP address data. The results were very good: in no case were the results off by more than one, and in each of those cases the omitted machines were very light users of the Internet, and fell beneath the thresholds.

Figure 4A:
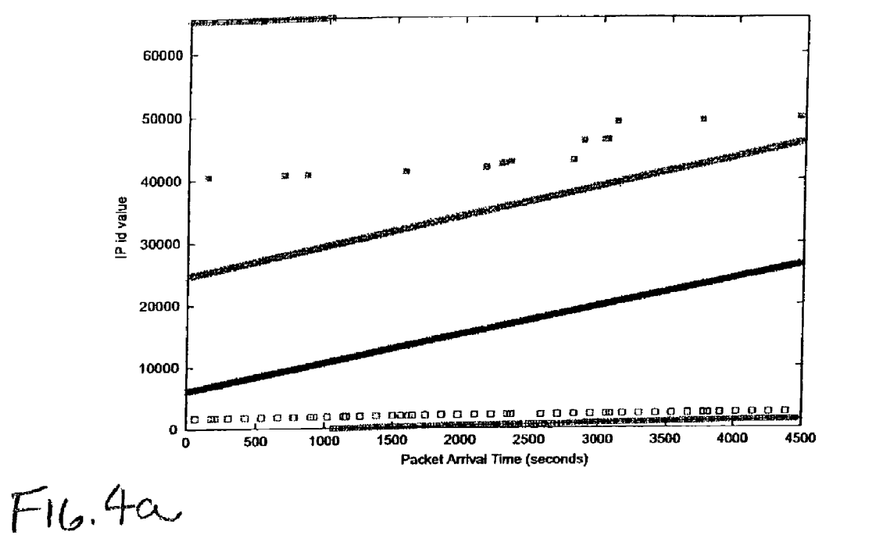
FIGS. 4a, 4b and 4c are graphical representations of ID field data from hosts in a network.
Figure 4B:
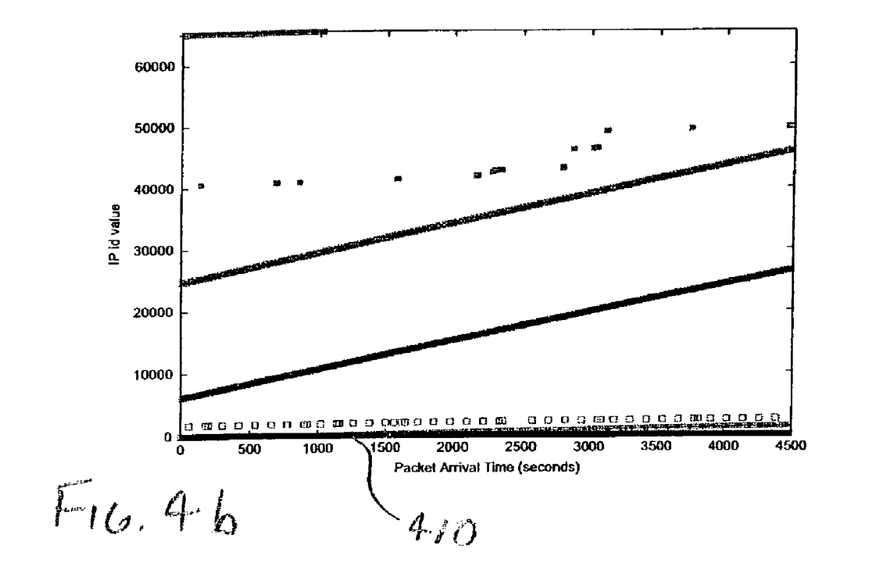
Figure 4C:
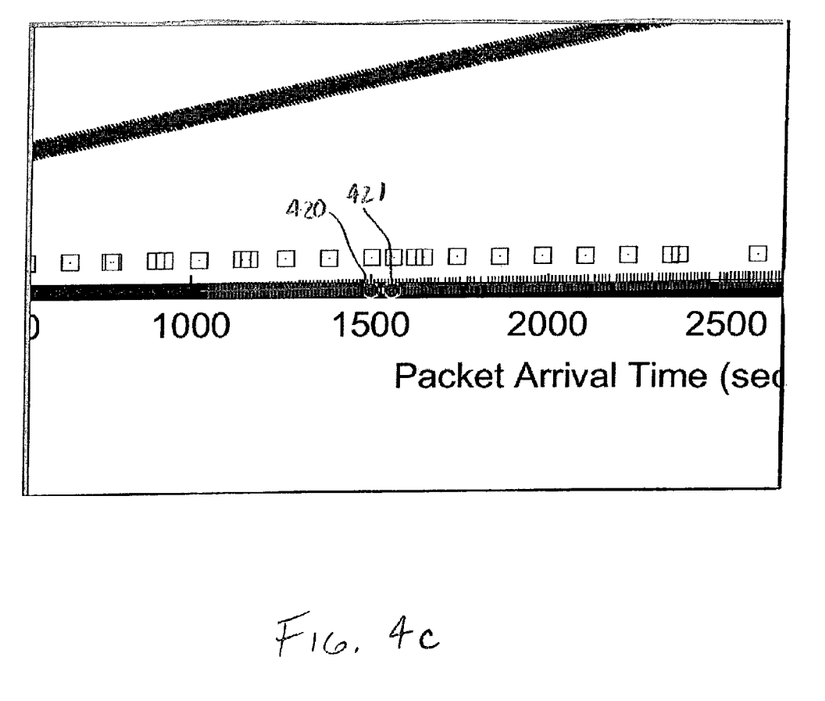

Another set of sample data is shown in FIGS. 4a, 4b and 4c. FIG. 4b shows raw data as received from the hosts in accordance with the invention. FIG. 4a shows the data as collected by the algorithm described above. While the two are almost identical there are several differences. First, there is a sequence of packets 410 having an IPid value of 0 in the control data shown in FIG. 4*b*. Those packets were dropped by the analysis algorithm in accordance with the rule described above, and so are absent from the data shown in FIG. 4*a*. Investigation of the control data showed that those packets came from a router that used a 0 IPid for link-local OSPF packets, and a sequential IPid for TCP.

A second difference between the control data and the data collected by the algorithm is that the algorithm missed one host. Examination of the source data, a portion of which is shown enlarged in FIG. 4*c*, shows that the missing host sent only a few packets, such as packets 420, 421, all with 0 IPid's. Those packets were dropped together with the other 0-value IPid packets.

Figure 5A:
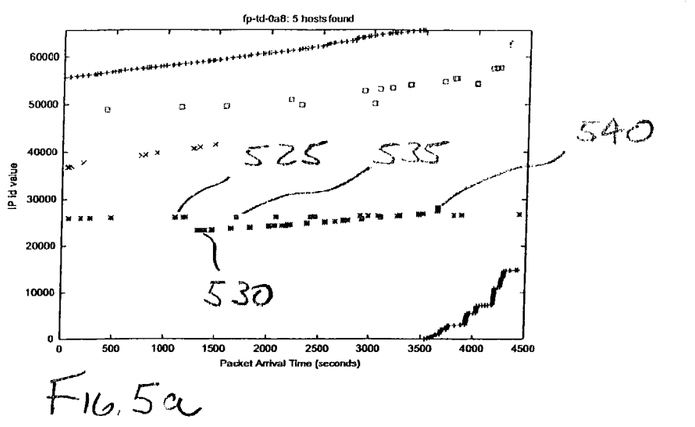
FIGS. 5a and 5b are graphical representations of ID field data from hosts in a network.
Figure 5B:
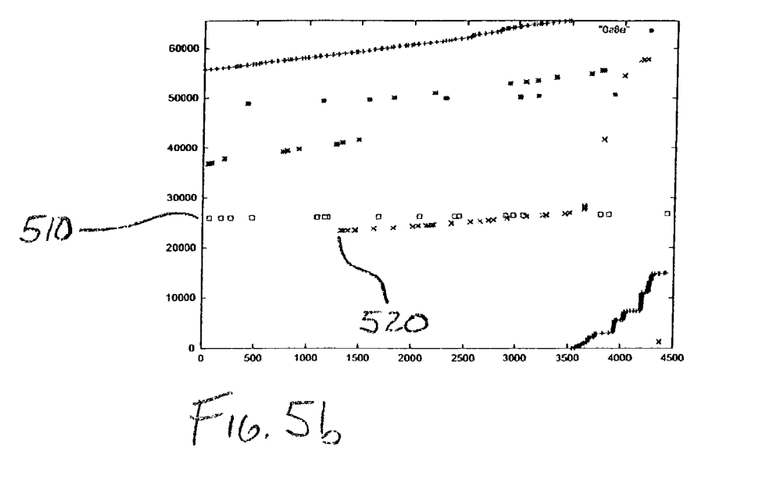

Collisions in IPid space can prove troublesome. FIGS. 5*a* and 5*b* represent data from another subnet that demonstrates that problem. FIG. 5*a* shows an analytic graph produced by the algorithm of the invention and FIG. 5*b* shows a control graph. As shown in the raw data of FIG. 5*b*, in the sequence 510 starting with an IPid value of about 26000, a second host 520 starts sending at about 1300 seconds into the trace. The analysis shown in FIG. 5*a* missed that, and assumed that those packets 530 were a continuation of the sequence 525 from the first host. The algorithm did, however, recognize the second host at about t=1600 (point 535), but mismatched both streams until the second host went silent at t=3750 (point 540).

Figure 6:
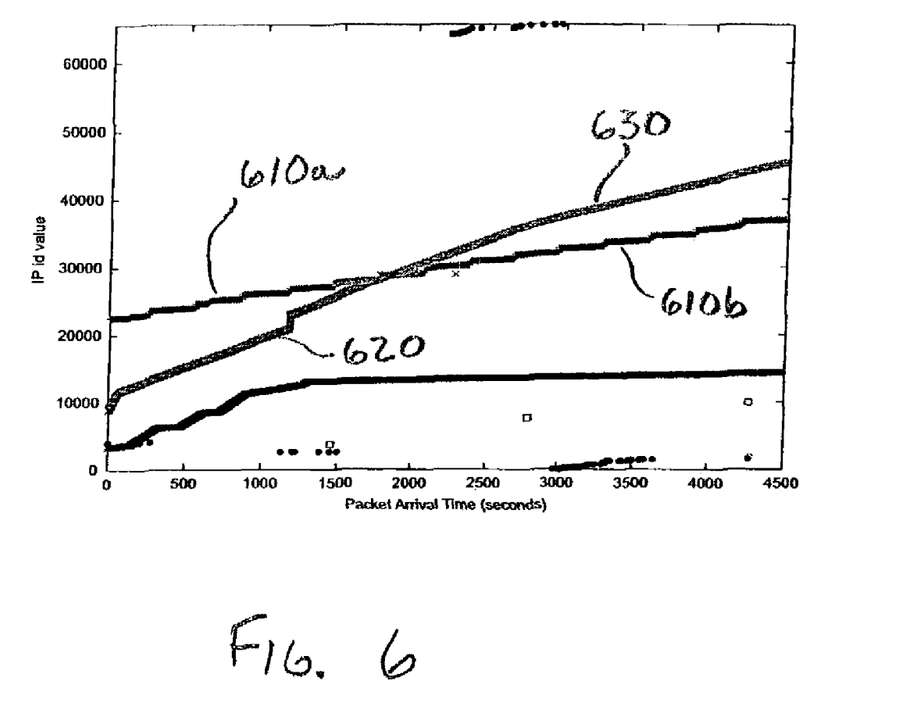
FIG. 6 is a graphical representation of ID field data from hosts in a network.

A more serious collision is shown in FIG. 6, where what are clearly two hosts are interpreted as three. While the algorithm correctly interprets segments 610*a* and 610*b* as a single host, the algorithm incorrectly separates segments 620 and 630 into individual hosts.

In general, large numbers of packets (or even of hosts) do not confuse the analysis engine. A test on 66,563 packets from 26 hosts produced a plausible (though not absolutely correct) graph, with errors mostly from IPid collisions. Large gaps in the space, however, caused considerable trouble. Those gaps were presumably caused by intranet activity.

In another embodiment, other packet header data can be used as an adjunct to the IPid field. For example, in a TCP connection (see J. Postel, "Transmission Control Protocol", RFC 793, IETF, September, 1981, the contents of which are hereby incorporated herein by reference) the four fields <source host, source port, destination host, destination port> unambiguously identify packets belonging to a particular connection. It is clear that packets within one connection originated from a single host. Thus, in that embodiment, packets can first be grouped by the connection information, and the IPid fields of packets from different connections can be used to assign different connections to different sources.

It is further observable that, given packets from a single connection, it is straightforward to examine the IPid field among those packets. That will let one determine whether or not a machine uses byte-swapping. For that matter, such examination may show that some source machine uses a different assignment algorithm entirely, thus allowing one to discard some packets as unsuitable for this method, or to use a cryptanalytic algorithm if appropriate.

Other information besides those TCP fields can be used to assign packets to a connection. For example, the Real-Time Protocol ("RTP") (see H. Schulzrinne, S. Casner, R. Frederick, and V. Jacobson, "RTP: A Transport Protocol for Real-Time Applications", RFC 1889, IETF, January 1996, the contents of which are hereby incorporated herein by reference) packet headers contain a source machine identifier, sequence numbers, and timestamps.

There are many other examples as well, including some that rely on packet content rather than just headers. The reply to an ordinary Web-browsing request (see T. Berners-Lee, "Hypertext Transfer Protocol—HTTP/1.0", RFC 1945, IETF, May 1996, and T. Berners-Lee and D. Connolly, "Hypertext Markup Language—2.0", RFC 1866, IETF, November 1995, the contents of both of which are hereby incorporated herein by reference) contains embedded references to images that are to be displayed on the Web page. The machine receiving such an HTML document will make further requests for said images; a monitoring station that correlated HTML that listed image files with requests for those images would naturally link the different connections as originating from the same machine.

The technique of the invention has been found to be primarily suitable for analyzing NATs serving networks with comparatively little Intranet traffic. That would describe most home NATs and virtually all hotel NATs. It does not describe the majority of businesses, which tend to run their own file and email servers.

Testing was performed on commercial home NAT devices, including a Cayman 2E-H, a Netgear RF314, an Allied Telesyn AR220E, and a Linksys BEFSR41. In addition, the NAT component of a version of Darren Reed's IP Filter package was tested. The testing included sending small and large (i.e., intentionally fragmented) ICMP "ping" packets, and TCP packets with and without the "Don't Fragment" bit set. Packets on both sides of the NAT were then monitored. The results were the same in all cases: the IPid field was not rewritten, the correctness arguments discussed below notwithstanding.

Many organizations (and individuals) do not wish any disclosure of the number of machines behind their NATs. A properly designed NAT can block information leakage; however, a great deal of care is necessary to avoid violating the defined semantics of the IPid field and IP fragment reassembly. There are three possible cases.

In all packets emitted by the NAT, the source IP address will be changed to either a single value or a value drawn from a very small set. Furthermore, most packets use TCP. That means that uniqueness must be maintained at least on a per-destination address basis, if fragmentation is possible.

The simplest case, though, is if the DF (Don't Fragment) bit is set in the IP header of the incoming packet. That is, in fact, reasonably common, since the DF flag is used for Path MTU Discovery. In such situations, the NAT box can rewrite the IPid field freely, since there will never be any reassembly. Setting it to 0, as Linux does, is one possibility; as discussed below, in a NAT situation this can leak information, and hence is probably undesirable.

The second case is ordinary packets with DF not set. Such packets may be fragmented by any router along the path to the destination, and hence must carry unique IPid fields. Accordingly, a NAT should rewrite all such IPid fields, to ensure uniqueness. Setting the DF bit is generally inadvisable, since that would place the burden of Path MTU Discovery on the NAT.

Some hosts never use Path MTU Discovery; some use it only for TCP. A NAT that treated DF packets differently than non-DF packets for the same protocol would thus leak the fact that at least two different policies exist behind it. Therefore, to preserve privacy, the NAT should do the same thing—send a unique IPid field—on all packets.

The third case, though, is more complex, and puts an extra burden on NATs: where already-fragmented packets arrive at the NAT, it must preserve uniqueness while also ensuring that all fragments of the same datagram carry the same new IPid field. Doing so requires that it keep state for each fragment of each packet, until it determines that it has sent all fragments of it.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, in some situations, other header fields might be usable. With some NAT boxes, port numbers might suffice. IPsec sequence numbers could be used to measure VPN users. Even TCP sequence numbers could be used with older hosts. It is to be understood that the embodiments shown and described herein are only illustrative of the principles of the present invention and that various modifications may be implemented by those skilled in the art without departing from the scope and spirit of the invention.

What is claimed is:

1. A method for counting hosts behind a network address translator in a network using a network device that is not behind the network address translator and using a protocol defining packets with identifiers, comprising:
reading a plurality of the identifiers that each include an internet protocol identification field read from an internet protocol header of a packet of a plurality of the packets transmitted from the network address translator, wherein the internet protocol identification field is adapted for fragment reassembly and is not an address;
forming a plurality of subsets of the packets based on the identifiers;
automatically adding packets having an internet protocol identification value of zero to a nonmatching subset selected from the plurality of subsets of the packets;
counting the plurality of subsets of the packets to determine a count of the plurality of subsets of the packets, wherein the plurality of subsets of the packets includes the nonmatching subset; and
reporting a determined count of the hosts behind the network address translator, wherein the determined count of the hosts is the count of the plurality of subsets of packets.

2. The method of claim 1, wherein the identifiers comprise values in identification fields of packet headers.

3. The method of claim 2, wherein the plurality of subsets comprise the packets containing sequential series of identification field values.

4. The method of claim 3, wherein each sequential series of identification field values contains gaps no greater than a predetermined maximum.

5. The method of claim 1, further comprising forming byte-swapped subsets of the plurality of the identifiers, each byte-swapped subset comprising a sequential series of byte-swapped values of the identifiers, and wherein counting includes counting the byte-swapped subsets of identifiers.

6. The method of claim 1, wherein the identifiers include, for each packet, at least one identifier indicative of a connection.

7. The method of claim 6, wherein the at least one identifier indicative of the connection comprises image file references in content of the packets.

8. The method of claim 6, wherein the connection is a transmission control protocol connection and the at least one identifier indicative of the connection comprises contents of packet header fields selected from the group consisting essentially of source host, source port, destination host, and destination port.

9. The method of claim 6, wherein the connection is a real-time transport protocol connection and the at least one identifier indicative of the connection comprises contents of packet header fields selected from the group consisting essentially of source machine identifier, sequence number, and timestamp.

10. The method of claim 6, wherein the forming the plurality of subsets includes:
forming groups of the packets according to the at least one identifier indicative of the connection; and
forming the plurality of subsets by linking the groups of the packets according to contents of the internet protocol identification field.

11. The method of claim 10, further comprising:
determining a pattern of identification field contents in the packets within a group; and
wherein the groups are linked according to the pattern of identification field contents.

12. The method of claim 11, wherein the pattern of identification field contents is a byte swapped sequence.

13. The method of claim 11, wherein the pattern of identification field contents is determined using cryptanalysis.

14. The method of claim 1, further comprising:
maintaining a first collection of sequences for normally-incremented internet protocol identification fields; and
maintaining a second collection of sequences for byte-swapped internet protocol identification fields.

15. The method of claim 1, wherein the identifiers are not a source host, source port, destination host, or destination port.

16. The method of claim 1, wherein the identifiers are internet protocol identifiers as defined in RFC 703.

17. The method of claim 1, wherein the identifiers are sequenced modulo $2^{16}$.

18. The method of claim 1, further comprising:
determining that a second identifier of the plurality of identifiers is exactly one higher than a first identifier of the plurality of identifiers via modulo $2^{16}$ sequencing.

19. The method of claim 1, further comprising:
maintaining a first collection of sequences for normally-incremented internet protocol identification fields;
maintaining a second collection of sequences for byte-swapped internet protocol identification fields;
determining whether or not a source machine of the packets uses byte-swapping; and
matching a new received packet against both the first collection and the second collection and only if no match is detected, forming a new subset.

20. The method of claim 1, further comprising:
detecting that values of the internet protocol identification field are randomized.

21. A method for determining a number of hosts behind a network address translator in a network using a network device that is not behind the network address translator and using a packet protocol defining a header with an identification string, comprising:
reading an identification string from a packet header of a packet transmitted from the network address translator, wherein the identification string is an internet protocol identification field, which is not an address and is adapted for fragment reassembly;
comparing the identification string with at least one series of identification strings formed from a plurality of previously read identification strings;

if the identification string matches one of the at least one series of identification strings, adding the identification string to the at least one series of identification strings, otherwise, starting a new series with the identification string;

automatically adding packets having an internet protocol identification value of zero to a nonmatching series selected from the at least one series of identification strings;

counting the at least one series of identification strings to determine a count of the at least one series of identification strings, wherein the count of the at least one series of identification strings is the number of hosts behind the network address translator, wherein the at least one series of identification strings includes the nonmatching series; and reporting the number of hosts behind the network address translator.

22. The method of claim 21, wherein the series of identification strings contain identification strings with values that are consecutive.

23. The method of claim 21, wherein the comparing step includes:
checking whether the identification string is more than a predetermined time limit older or newer than a last read identification string in a series; and
if so, deeming the identification string not to match that series.

24. The method of claim 21, further comprising automatically dropping discovery packets.

25. The method of claim 21, further comprising coalescing at least one pair of identification string series having endpoints that are within a predetermined value of each other.

26. The method of claim 25, wherein coalescing the series of identification strings is performed only on pairs of identification string series that further have endpoints that are within a predetermined time limit of each other.

27. The method of claim 21, further comprising discarding series of identification strings having a number of identification strings lower than a predetermined minimum.

28. The method of claim 21, further comprising comparing the identification string with at least one series of byteswapped identification strings formed from byteswapped values of the plurality of previously read identification strings.

29. The method of claim 21, wherein the identification string is added to more than one series if the identification string matches each of those series equally well.

30. The method of claim 21, wherein comparing includes:
checking whether the identification string has a value that is more than a predetermined value higher or lower than a value of a last read identification string in the at least one series; and
if so, deeming the identification string not to match the at least one series.

31. The method of claim 21, wherein comparing includes:
checking whether the identification string has a value exactly one higher than a value of a last read identification string in the at least one series, and, if so, deeming the string to match the at least one series; and, if not, checking whether the identification string has the value that is within a predetermined value higher or lower than the value of the last read identification string in the at least one series, and, if so, deeming the string to match the at least one series.

32. The method of claim 21, further comprising:
maintaining a first collection of sequences for normally-incremented internet protocol identification fields; and
maintaining a second collection of sequences for byte-swapped internet protocol identification fields.

33. A method for determining a number of hosts behind a network address translator in a network using a network device that is not behind the network address translator and using a packet protocol defining a connection identifier and a header with an internet protocol identification field, comprising:
reading a connection identifier and the internet protocol identification field from a packet transmitted from the network address translator, wherein the internet protocol identification field is adapted for fragment reassembly and is not an address;
based on the connection identifier, placing the packet in a group containing other packets transmitted over a common connection;
based on identification strings of packets, coalescing the group with at least one other group originating from a common host, to form a plurality of series of packets;
automatically adding packets having an internet protocol identification value of zero to a nonmatching series selected from the plurality of series of packets;
counting the plurality of series of packets to determine a count of the plurality of series of packets, wherein the count of the plurality of series of packets is the number of hosts behind the network address translator, wherein the plurality of series of packets includes the nonmatching series; and
reporting the number of hosts behind the network address translator.

34. The method of claim 33, wherein the series comprise packets containing sequential series of identification field values.

35. The method of claim 33, wherein the connection identifier comprises image file references in content of the packets.

36. The method of claim 33, wherein the common connection is a transmission control protocol connection and the connection identifier comprises contents of packet header fields selected from the group consisting essentially of source host, source port, destination host, and destination port.

37. The method of claim 33, wherein the common connection is a real-time transport protocol connection and the connection identifier comprises contents of packet header fields selected from the group consisting essentially of source machine identifier, sequence number, and timestamp.

38. The method of claim 33, further comprising:
determining a pattern of identification field contents in packets within the group; and
wherein groups are coalesced according to the pattern of identification field contents.

39. The method of claim 38, wherein the pattern of identification field contents is determined by determining whether the pattern is a byte swapped sequence.

40. The method of claim 38, wherein the pattern of identification field contents is determined using cryptanalysis.

* * * * *